US011804236B2

(12) United States Patent
Zhang (10) Patent No.: US 11,804,236 B2
(45) Date of Patent: Oct. 31, 2023

(54) METHOD FOR DEBUGGING NOISE ELIMINATION ALGORITHM, APPARATUS AND ELECTRONIC DEVICE

(71) Applicant: APOLLO INTELLIGENT CONNECTIVITY (BEIJING) TECHNOLOGY CO., LTD., Beijing (CN)

(72) Inventor: Tengfei Zhang, Beijing (CN)

(73) Assignee: APOLLO INTELLIGENT CONNECTIVITY (BEIJING) TECHNOLOGY CO., LTD.

( * ) Notice: Subject to any disclaimer, the term of this patent is extended or adjusted under 35 U.S.C. 154(b) by 58 days.

(21) Appl. No.: 17/361,445

(22) Filed: Jun. 29, 2021

(65) Prior Publication Data

US 2021/0327451 A1 Oct. 21, 2021

(30) Foreign Application Priority Data

Dec. 15, 2020 (CN) .......................... 202011482483.5

(51) Int. Cl.
| | | |
|---|---|---|
| *G10L 21/034* | (2013.01) | |
| *G10L 21/0208* | (2013.01) | |
| *G10L 21/0232* | (2013.01) | |
| *G06F 11/30* | (2006.01) | |
| *G06F 11/36* | (2006.01) | |

(52) U.S. Cl.
CPC ...... *G10L 21/0232* (2013.01); *G06F 11/3075* (2013.01); *G06F 11/3656* (2013.01); *G10L 21/034* (2013.01); *G10L 2021/02087* (2013.01)

(58) Field of Classification Search
CPC .................. G10L 21/034; G10L 2021/02087
See application file for complete search history.

(56) References Cited

U.S. PATENT DOCUMENTS 8,615,393 B2 * 12/2013 Tashev ................ G10L 21/0208
704/226
10,078,717 B1 * 9/2018 Venkataramani ..... G06F 30/327
(Continued)

FOREIGN PATENT DOCUMENTS

| CN | 106792315 A | 5/2017 |
|---|---|---|
| CN | 107086034 A | 8/2017 |

(Continued)

OTHER PUBLICATIONS

European Search Report in EP Patent Application No. 21182484.2 dated Dec. 20, 2021.

(Continued)

*Primary Examiner* — Bryan S Blankenagel
(74) *Attorney, Agent, or Firm* — Dilworth IP, LLC (57) ABSTRACT

The application discloses a debugging method for a noise elimination algorithm, an apparatus and an electronic device, which relate to the technical fields of voice, automatic driving and intelligent transportation. An implementation scheme is: when the noise elimination algorithm is debugged, acquiring multiple voice control signals from a vehicle to be debugged, modifying a weight of a configuration parameter of the noise elimination algorithm in a digital signal processing to obtain an updated noise elimination algorithm; then adopting the updated noise elimination algorithm to perform noise elimination processing on the multiple voice control signals; if control results of noise-eliminated voice control signals on the vehicle to be debugged do not meet a preset condition, continuing to modify the weight of the configuration parameter until the preset condition is met, and then sending a noise elimination algorithm that meets the preset condition to the vehicle to be debugged.

18 Claims, 6 Drawing Sheets

(56) References Cited

U.S. PATENT DOCUMENTS

| | | | |
|---|---|---|---|
| 10,347,236 B1* | 7/2019 | Bastyr | G10K 11/17823 |
| 2011/0307253 A1 | 12/2011 | Lloyd et al. | |
| 2012/0330651 A1* | 12/2012 | Obuchi | G10L 15/01 |
| | | | 704/E21.001 |
| 2013/0325449 A1* | 12/2013 | Levien | G10L 15/06 |
| | | | 704/201 |
| 2014/0086425 A1* | 3/2014 | Jensen | G10K 11/17825 |
| | | | 381/71.11 |
| 2015/0071453 A1* | 3/2015 | Po | G10K 11/17817 |
| | | | 381/71.11 |
| 2015/0317998 A1 | 11/2015 | Lee et al. | |
| 2020/0035233 A1* | 1/2020 | Lee | G10L 21/0232 |
| 2020/0128375 A1* | 4/2020 | Shahmurad | H04W 4/48 |
| 2020/0211580 A1 | 7/2020 | Lee et al. | |
| 2021/0166683 A1* | 6/2021 | Joh | H04R 1/406 |
| 2022/0060812 A1* | 2/2022 | Ganeshkumar | G10K 11/17815 |
| 2022/0165292 A1* | 5/2022 | Saki | G06N 20/00 |
| 2023/0012342 A1* | 1/2023 | Zhao | H05B 47/12 |

FOREIGN PATENT DOCUMENTS

| | | |
|---|---|---|
| CN | 107742155 A | 2/2018 |
| CN | 108956172 A | 12/2018 |
| CN | 109087659 A | 12/2018 |
| CN | 109587618 A | 4/2019 |
| CN | 111031186 A | 4/2020 |
| CN | 111477206 A | 7/2020 |
| CN | 111723415 A | 9/2020 |
| CN | 111768759 A | 10/2020 |
| JP | 2018205512 A | 12/2018 |
| JP | 2002182687 A | 6/2022 |
| KR | 20100101986 A | 9/2010 |
| KR | 101628112 B1 | 6/2016 |

OTHER PUBLICATIONS

Wang, Yuelin, Test Platform for Active Noise Control System in Enclosure, CNKI, Dec. 15, 2015, pp. 1-90.
First Office Action in CN Patent Application No. 202011482483.5 dated Aug. 5, 2022.
Kawase, Tomoko, A study on noise environment adaptation of speech recognition parameters including sound recognition, 2015, pp. 1-5.
Higuchi, Takuya, Speech enhancement front-end optimization based on speech recognizer recognition standard, 2017, NTT Corporation, pp. 1-3.
First Office Action in JP Patent Application No. 2021-179138 dated Dec. 27, 2022.

* cited by examiner

METHOD FOR DEBUGGING NOISE ELIMINATION ALGORITHM, APPARATUS AND ELECTRONIC DEVICE

CROSS-REFERENCE TO RELATED APPLICATION

This application claims priority to Chinese Patent Application No. 202011482483.5, filed on Dec. 15, 2020, which is hereby incorporated by reference in its entirety.

TECHNICAL FIELD

The present application relates to the field of computer technology, in particular to a method for debugging a noise elimination algorithm, an apparatus and an electronic device, which can be specifically used in the technology field of voice, automatic driving, and intelligent transportation.

BACKGROUND

Noise elimination algorithm in a digital signal processing (DSP for short) mainly performs noise elimination processing on a noise signal in a voice signal, and is widely used in intelligent vehicle-mounted systems or furniture systems.

In order to ensure that the noise elimination algorithm has a better noise elimination effect, before the noise elimination algorithm is put into use, the noise elimination algorithm needs to be debugged, so that a debugged noise elimination algorithm can meet the noise elimination requirements.

Therefore, how to implement the debugging of the noise elimination algorithm so that the debugged noise elimination algorithm can meet the noise elimination requirements is a problem to be solved urgently by the technicians of the present application.

SUMMARY

The present application provides a method for debugging a noise elimination algorithm, an apparatus and an electronic device, which realizes the debugging of the noise elimination algorithm, so that the debugged noise elimination algorithm can meet the noise elimination requirements.

According to an aspect of the present application, a method for debugging a noise elimination algorithm is provided, where the method for debugging the noise elimination algorithm may include:
  acquiring multiple voice control signals from a vehicle to be debugged;
  modifying a weight of a configuration parameter of the noise elimination algorithm in a digital signal processing based on the multiple voice control signals to obtain an updated noise elimination algorithm;
  adopting the updated noise elimination algorithm to perform noise elimination processing on the multiple voice control signals; if control results of noise-eliminated voice control signals on the vehicle to be debugged do not meet a preset condition, continuing to modify the weight of the configuration parameter until the control results of noise-eliminated voice control signals on the vehicle to be debugged meet the preset condition; and
  sending a noise elimination algorithm that meets the preset condition to the vehicle to be debugged.

According to another aspect of the present application, a method for debugging a noise elimination algorithm is further provided, where the method for debugging the noise elimination algorithm may include:
  sending multiple voice control signals to a terminal device;
  receiving a noise elimination algorithm that meets a preset condition from the terminal device; and
  performing noise elimination processing according to the noise elimination algorithm that meets the preset condition.

According to another aspect of the present application, an apparatus for debugging a noise elimination algorithm is further provided, where the apparatus for debugging the noise elimination algorithm may include:
  an acquiring unit, configured to acquire multiple voice control signals from a vehicle to be debugged;
  a first processing unit, configured to modify a weight of a configuration parameter of the noise elimination algorithm in a digital signal processing based on the multiple voice control signals to obtain an updated noise elimination algorithm;
  a second processing unit, configured to adopt the updated noise elimination algorithm to perform noise elimination processing on the multiple voice control signals; if control results of noise-eliminated voice control signals on the vehicle to be debugged do not meet a preset condition, continue to modify the weight of the configuration parameter until the control results of noise-eliminated voice control signals on the vehicle to be debugged meet the preset condition; and
  a sending unit, configured to send a noise elimination algorithm that meet the preset condition to the vehicle to be debugged.

According to another aspect of the present application, an apparatus for debugging a noise elimination algorithm is further provided, where the apparatus for debugging the noise elimination algorithm may include:
  a first sending unit, configured to send multiple voice control signals to a terminal device;
  a first receiving unit, configured to receive a noise elimination algorithm that meets a preset condition from the terminal device; and
  a first processing unit, configured to perform noise elimination processing according to the noise elimination algorithm that meets the preset condition.

According to another aspect of the present application, an electronic device is further provided, including:
  at least one processor; and
  a memory communicatively connected with the at least one processor; where,
  the memory stores instructions executable by the at least one processor, and the instructions are executed by the at least one processor to enable the at least one processor to execute the method for debugging the noise elimination algorithm described in the first aspect above, or the method for debugging the noise elimination algorithm described in the second aspect.

According to another aspect of the present application, a non-transitory computer-readable storage medium storing computer instructions is further provided, where the computer instructions are used to cause a computer to execute the method for debugging the noise elimination algorithm described in the first aspect, or the method for debugging the noise elimination algorithm described in the second aspect.

According to another aspect of the present application, a computer program product is further provided, including: a computer program stored in a readable storage medium, at least one processor of an electronic device can read the computer program from the readable storage medium, and the at least one processor executes the computer program to cause the electronic device to execute the method for debugging the noise elimination algorithm described in the first aspect above, or execute the method for debugging the second aspect above.

In the technical solution of the present application, when debugging the noise elimination algorithm, the terminal device acquires multiple voice control signals from a vehicle to be debugged, modifies a weight of a configuration parameter of the noise elimination algorithm in a digital signal processing based on the multiple voice control signals to obtain an updated noise elimination algorithm; and then adopts the updated noise elimination algorithm to perform noise elimination processing on the multiple voice control signals; if control results of noise-eliminated voice control signals on the vehicle to be debugged do not meet a preset condition, continues to modify the weight of the configuration parameter until the control results of noise-eliminated voice control signals on the vehicle to be debugged meet the preset condition, so that the debugging of the noise elimination algorithm is realized, and the noise elimination algorithm obtained after debugging can meet a noise elimination requirement, and then sends a noise elimination algorithm that meets the preset condition to the vehicle to be debugged, so that the vehicle to be debugged performs noise elimination based on the noise elimination algorithm that meets the preset condition.

In addition, in the entire debugging process of the noise elimination algorithm, even if the weights of the configuration parameter of the noise elimination algorithm need to be modified multiple times, the terminal device only acquires the voice control signals from the vehicle to be debugged once, which solves the problem that every time the configuration parameter of the noise elimination algorithm is modified, testers need to be called to input original voice signals to the vehicle to be debugged, thereby improving the test efficiency.

It should be understood that the content described in this section is not intended to identify the key or important features of the embodiments of the present application, nor is it intended to limit the scope of the present application. Other features of the present application will be easily understood through the following description.

BRIEF DESCRIPTION OF DRAWINGS

The drawings are used to better understand the solution, and do not constitute a limitation to the application. among them.

DESCRIPTION OF EMBODIMENTS

The following describes exemplary embodiments of the present application with reference to the accompanying drawings, which include various details of the embodiments of the present application to facilitate understanding, and should be considered as merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures are omitted in the following description.

Noise elimination algorithm in a digital signal processing (DSP for short) mainly performs noise elimination processing on a noise signal in a voice signal, and is widely used in intelligent vehicle-mounted systems or furniture systems. In order to ensure that the noise elimination algorithm has a better noise elimination effect, before the noise elimination algorithm is put into use, the noise elimination algorithm needs to be debugged, so that a debugged noise elimination algorithm can meet the noise elimination requirements.

When debugging the noise elimination algorithm in the vehicle to be debugged, a group of testers can be recruited first and input original voice signals to the vehicle to be debugged. After the vehicle to be debugged receives the original voice signals input by multiple testers, the noise elimination algorithm in the vehicle to be debugged is used to perform noise elimination processing on the multiple original voice signals to obtain multiple noise-eliminated voice signals; then the multiple noise-eliminated voice signals are used as wake-up signals respectively to judge whether the multiple voice signals can wake up the vehicle-mounted terminal in the vehicle to be debugged; if a wake-up rate corresponding to the multiple voice signals does not meet customer's requirements, the signal processing engineer modifies a configuration parameter in the noise elimination algorithm to obtain an updated noise elimination algorithm. A group of testers is recruited, and then input the original voice signals to the vehicle to be debugged. After the vehicle to be debugged receives the original voice signals input by multiple testers, it uses the noise elimination algorithm in the vehicle to be debugged to perform noise elimination processing on the multiple original voice signals to obtain multiple noise-eliminated voice signals; then the multiple noise-eliminated voice signals are used as wake-up signals respectively to judge whether the multiple voice signals can wake up the vehicle-mounted terminal in the vehicle to be debugged. If a wake-up rate corresponding to multiple voice signals meets the customer's requirements, the updated noise elimination algorithm is used as a final noise elimination algorithm for the noise elimination processing operation of the vehicle to be debugged. On the contrary, if the wake-up rate corresponding to the multiple voices signal does not meet the customer's requirements, the signal processing engineer modifies the configuration parameter in the updated noise elimination algorithm again to obtain a new noise elimination algorithm. A group of testers is recruited again to test again until a wake-up rate corresponding to the multiple noise-eliminated voice signals meets the customer's requirements, the updated noise elimination algorithm is used as the final noise elimination algorithm for the noise elimination processing operation of the vehicle to be debugged.

Using the above method, although the debugging of the noise elimination algorithm can be realized, in the process of debugging the noise elimination algorithm, every time the configuration parameter of the noise elimination algorithm is modified, testers need to be called to input the original voice signals to the vehicle to be debugged, that is, the testers need to be called up repeatedly, which will result in low test efficiency.

In order to reduce the number of times that testers are called up to improve test efficiency, it can be considered that when the noise elimination algorithm is first debugged, testers are called to only input voice signals in the vehicle to be debugged, and the vehicle to be debugged can send the acquired voice signals input by the testers to the terminal device, so that the terminal device receives and saves the voice signals input by the testers, thereby, in the subsequent debugging of the noise elimination algorithm, the debugging can be continued based on the voice signals input by the testers, so as to realize the debugging of the noise elimination algorithm. In addition, in the debugging process of debugging the noise elimination algorithm, even if the weight of the configuration parameter of the noise elimination algorithm needs to be modified many times, the terminal device only acquires the voice control signals once from the vehicle to be debugged. Therefore, the problem that every time the configuration parameter of the noise elimination algorithm is modified, testers need to be called to input original voice signals to the vehicle to be debugged is solved, thereby improving the test efficiency.

Based on the above-mentioned concept, an embodiment of the present application provides a method for debugging a noise elimination algorithm, which can be applied to a scenario of debugging a noise elimination algorithm. For an example, please refer to FIG. 1, which is a schematic diagram of an application scenario according to an embodiment of the present application. The system for debugging the noise elimination algorithm can include a vehicle to be debugged and a terminal device. The vehicle to be debugged first acquires multiple voice control signals and sends the acquired voice control signals to the terminal device. The terminal device modifies a weight of a configuration parameter of the noise elimination algorithm in a digital signal processing based on the multiple voice control signals to obtain an updated noise elimination algorithm; adopts the updated noise elimination algorithm to perform noise elimination processing on the multiple voice control signals; if control results of noise-eliminated voice control signals on the vehicle to be debugged do not meet a preset condition, continues to modify the weight of the configuration parameter until the control results of noise-eliminated voice control signals on the vehicle to be debugged meet the preset condition; and sends a noise elimination algorithm that meets the preset condition to the vehicle to be debugged, so that the vehicle to be debugged performs noise elimination based on the noise elimination algorithm that meets the preset condition.

Figure 1:
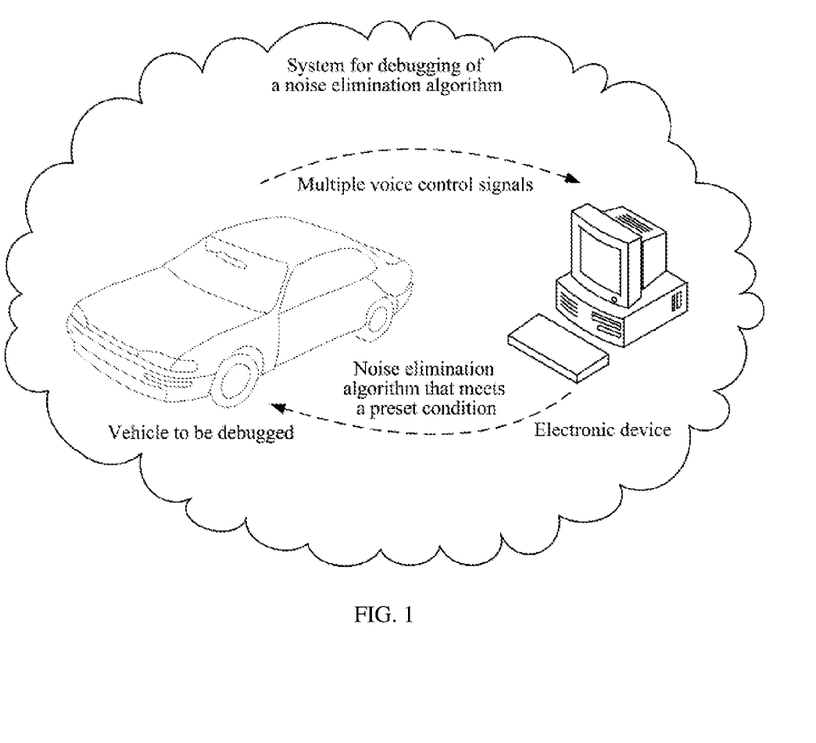
FIG. 1 is a schematic diagram of an application scenario according to an embodiment of the present application.

The voice control signals can be voice signals for controlling various functions in the vehicle to be debugged. For example, the voice control signal can be a voice control signal for a car window, a voice control signal for a vehicle-mounted music, or a voice control signal for a vehicle-mounted map, which can be set according to actual needs. Here, the embodiment of the present application does not make specific restrictions.

The control results include that the control is successful or the control is failed. It is understandable that, in the embodiment of the present application, when the voice control signal is a voice control signal for closing the car window, the control result of the noise-eliminated voice control signal on the vehicle to be debugged is whether the window is closed; when the voice control signal is a voice control signal for opening the car window, the control result of the noise-eliminated voice control signal on the vehicle to be debugged is whether the window is opened; when the voice control signal is a voice control signal for turning on the vehicle-mounted music, the control result of the noise-eliminated voice control signal on the vehicle to be debugged is whether the vehicle-mounted music is awakened; when the voice control signal is a voice control signal for turning off the vehicle-mounted music, the control result of the noise-eliminated voice control signal on the vehicle to be debugged is whether the vehicle-mounted music is turned off, etc., which can be set based on actual needs. Here, the embodiment of the present application is just taken as an example for description, but it does not mean that the embodiment of the present application is limited to this.

It can be seen that, in the embodiment of the present application, when debugging the noise elimination algorithm, the terminal device acquires multiple voice control signals from a vehicle to be debugged, modifies a weight of a configuration parameter of the noise elimination algorithm in a digital signal processing based on the multiple voice control signals to obtain an updated noise elimination algorithm; and then adopts the updated noise elimination algorithm to perform noise elimination processing on the multiple voice control signals; if control results of noise-eliminated voice control signals on the vehicle to be debugged do not meet a preset condition, continues to modify the weight of the configuration parameter until the control results of noise-eliminated voice control signals on the vehicle to be debugged meet the preset condition, so that the debugging of the noise elimination algorithm is realized, and the noise elimination algorithm obtained after debugging can meet a noise elimination requirement, and then sends a noise elimination algorithm that meets the preset condition to the vehicle to be debugged, so that the vehicle to be debugged performs noise elimination based on the noise elimination algorithm that meets the preset condition.

In addition, in the entire debugging process of the noise elimination algorithm, even if the weights of the configuration parameter of the noise elimination algorithm need to be modified multiple times, the terminal device only acquires the voice control signals from the vehicle to be debugged once, which solves the problem that every time the configuration parameter of the noise elimination algorithm is modified, testers need to be called to input original voice signals to the vehicle to be debugged, thereby improving the test efficiency.

Hereinafter, the method for debugging the noise elimination algorithm according to the present application will be described in detail through specific embodiments. It is understandable that the following specific embodiments can be combined with each other, and the same or similar concepts or processes may not be repeated in some embodiments.

First Embodiment

Figure 2:
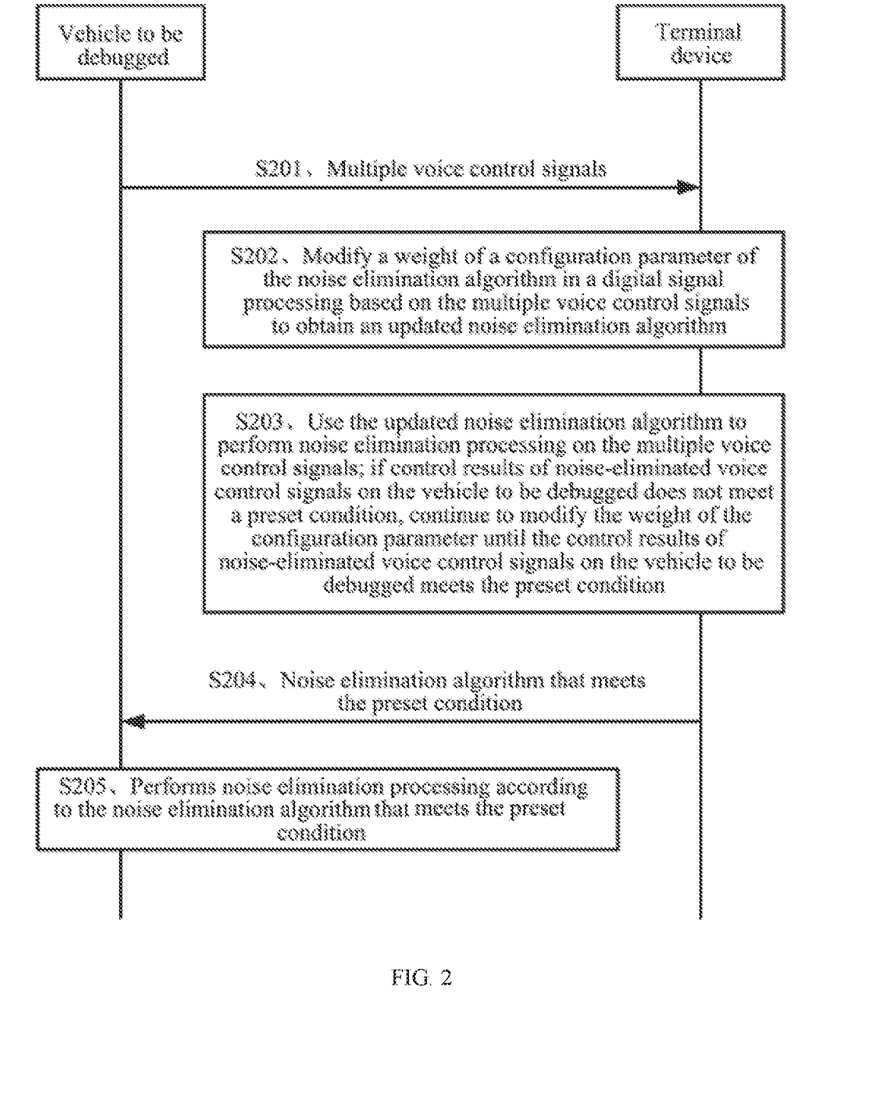
FIG. 2 is a schematic flowchart of a method for debugging a noise elimination algorithm according to a first embodiment of the present application.

FIG. 2 is a schematic flowchart of a method for debugging a noise elimination algorithm according to a first embodiment of the present application. The method for debugging the noise elimination algorithm may be executed by a software and/or hardware apparatus. For example, the hardware apparatus may be a terminal device or a server. Exemplarily, please refer to FIG. 2, the method for debugging the noise elimination algorithm may include:

S201. A vehicle to be debugged sends multiple voice control signals to a terminal device.

The number of the multiple voice control signals can be set according to actual needs. Here, the number of the multiple voice control signals is not further limited in the embodiment of the present application. It is understandable that, in the embodiment of the present application, the more the number of the voice control signals acquired, the better the noise elimination performance of the noise elimination algorithm obtained after a configuration parameter of the noise elimination algorithm is modified based on the voice control signals.

Before the vehicle to be debugged sends the multiple voice control signals to the terminal device, the vehicle to be debugged needs to acquire the multiple voice control signals. For example, when the vehicle to be debugged acquires the multiple voice control signals, a group of testers can be recruited first. By the multiple voice control signals are input to the vehicle to be debugged, a voice collector of the vehicle to be debugged can collect the multiple voice control signals input by the testers. When the multiple voice control signals input by the testers are collected, noise signals may be collected together, such as wind noise, tire noise, or other noises. Therefore, the multiple voice control signals acquired by the vehicle to be debugged may include noise signals. It is understandable that the multiple voice control signals collected by the vehicle to be debugged can be used as test data for subsequent modification of the parameter in the noise elimination algorithm.

After the vehicle to be debugged acquires the multiple voice control signals, it can send the multiple voice control signals acquired to the terminal device through a wireless network, or it can also send the multiple voice control signals acquired to the terminal device through a Bluetooth connection, or it can also send the multiple voice control signals acquired to the terminal device in other ways, such as the way of U disk copy, which can be specifically set according to actual needs. Here, the embodiment of the present application is only described by taking an example where the vehicle to be debugged may send the multiple voice control signals acquired to the terminal device through a wireless network or through a Bluetooth connection, but it does not mean that the embodiment of the present application is limited to this.

After obtaining the multiple voice control signals from the vehicle to be debugged, the terminal device can save the multiple voice control signals, and modify a weight of the configuration parameter of the noise elimination algorithm in the digital signal processing based on the multiple voice control signals to obtain an updated noise elimination algorithm, that is, the following S202 is executed.

S202. The terminal device modifies a weight of a configuration parameter of the noise elimination algorithm in a digital signal processing based on the multiple voice control signals to obtain an updated noise elimination algorithm.

When the weight of the configuration parameter of the noise elimination algorithm in the digital signal processing is modified based on the multiple voice control signals, the multiple voice control signals can be used as test data, and the noise elimination algorithm in the digital signal processing is adopted to perform noise elimination processing on the multiple voice control signals to obtain multiple noise-eliminated voice control signals, and the weight of the configuration parameter of the noise elimination algorithm is modified according to the multiple noise-eliminated voice control signals to obtain the updated noise elimination algorithm.

After the updated noise elimination algorithm is obtained, instead of blindly using the updated noise elimination algorithm as the final noise elimination algorithm, it is necessary to test the updated noise elimination algorithm based on the multiple voice control signals again. When the updated noise elimination algorithm is tested, the updated noise elimination algorithm can be adopted to perform noise elimination processing on the multiple voice control signals, and it is further determined whether it is necessary to continue to further modify the weight of the configuration parameter of the updated noise elimination algorithm, namely, whether to perform the following S203 according to whether the control results of the noise-eliminated voice control signals on the vehicle to be debugged meet a preset condition.

S203. The terminal device adopts the updated noise elimination algorithm to perform noise elimination processing on the multiple voice control signals; if control results of noise-eliminated voice control signals on the vehicle to be debugged do not meet a preset condition, continues to modify the weight of the configuration parameter until the control results of noise-eliminated voice control signals on the vehicle to be debugged meet the preset condition.

Exemplarily, when it is determined whether the control results of the noise-eliminated voice control signals on the vehicle to be debugged meet the preset condition, a control success rate corresponding to the multiple voice control signals can first be determined according to respective control results of the multiple noise-eliminated voice control signals on the vehicle to be debugged; if the control success rate corresponding to the multiple voice control signals is less than a preset threshold, it is determined that the control results on the vehicle to be debugged do not meet the preset condition. When the control results on the vehicle to be debugged do not meet the preset condition, it means that the current noise elimination algorithm does not meet the noise elimination requirements, and it is necessary to continue to modify the weight of the configuration parameter until control results of the noise-eliminated voice control signals on the vehicle to be debugged meet the preset condition.

If the control success rate corresponding to the multiple voice control signals is greater than or equal to the preset threshold, it is determined that the control results on the vehicle to be debugged meet the preset condition. When the control results on the vehicle to be debugged meet the preset condition, it means that the current noise elimination algorithm meets the noise elimination requirements, and no further modification is needed. The noise elimination algorithm can be used as the final noise elimination algorithm. The preset threshold value can be set according to actual needs. Here, the value of the preset threshold value is not further limited in the embodiment of the present application.

As an example, when determining the control success rate corresponding to the multiple voice control signals according to the respective control results of the multiple noise-eliminated voice control signals on the vehicle to be debugged, it can first determine a number of a voice control signals whose control is successful among the multiple noise-eliminated voice control signals according to the respective control results of the multiple noise-eliminated voice control signals on the vehicle to be debugged, then determine a ratio of the number of the voice control signals whose control is successful with a number of the multiple noise-eliminated voice control signals, and determine the ratio as the control success rate corresponding to the multiple voice control signals.

Taking the multiple voice control signals as voice control signals for waking up vehicle-mounted music as an example, the updated noise elimination algorithm can be first adopted to perform eliminate noise processing on the multiple voice control signals. After the multiple noise-eliminated voice control signals are acquired, it determines whether the multiple noise-eliminated voice control signals can control wake-up of the vehicle-mounted music, respectively, calculates the number of voice control signals that can control wake-up of the vehicle-mounted music among the multiple noise-eliminated voice control signals, then calculates a ratio of the number of voice control signals that can control wake-up of the vehicle-mounted music with the number of the multiple voice control signals, and determines the ratio as the wake-up success rate corresponding to the multiple voice control signals. If the wake-up success rate corresponding to the multiple voice control signals is less than the preset threshold, it means that the current noise elimination algorithm does not meet the noise elimination requirements, and the weight of the configuration parameter need to be continuously modified until the calculated wake-up success rate corresponding to the multiple voice control signals is greater than or equal to the preset threshold. If the wake-up success rate corresponding to the multiple voice control signals is greater than or equal to the preset threshold, it means that the current noise elimination algorithm meets the noise elimination requirement, and no further modification is needed, the noise elimination algorithm can be used as the final noise elimination algorithm.

By modifying the weight of the configuration parameter, after the noise elimination algorithm that meets the preset condition is obtained, the noise elimination algorithm that meets the preset condition can be sent to the vehicle to be debugged to cause the vehicle to be debugged to perform noise elimination processing according to noise elimination algorithm that meets the preset condition, that is, to execute the following S204-S205:

S204. The terminal device sends the noise elimination algorithm that meets the preset condition to the vehicle to be debugged.

S205. The vehicle to be debugged performs noise elimination processing according to the noise elimination algorithm that meets the preset condition.

After the noise elimination algorithm that meets the preset condition is acquired, the noise elimination algorithm that meets the preset condition can be used as the final noise elimination algorithm, and the noise elimination algorithm is adopted for noise elimination processing.

It can be seen that, in the embodiment of the present application, when debugging the noise elimination algorithm, the terminal device acquires multiple voice control signals from a vehicle to be debugged, modifies a weight of a configuration parameter of the noise elimination algorithm in a digital signal processing based on the multiple voice control signals to obtain an updated noise elimination algorithm; and then adopts the updated noise elimination algorithm to perform noise elimination processing on the multiple voice control signals; if control results of noise-eliminated voice control signals on the vehicle to be debugged do not meet a preset condition, continues to modify the weight of the configuration parameter until the control results of noise-eliminated voice control signals on the vehicle to be debugged meet the preset condition, so that the debugging of the noise elimination algorithm is realized, and the noise elimination algorithm obtained after debugging can meet a noise elimination requirement, and then sends a noise elimination algorithm that meets the preset condition to the vehicle to be debugged, so that the vehicle to be debugged performs noise elimination based on the noise elimination algorithm that meets the preset condition.

In addition, in the entire debugging process of the noise elimination algorithm, even if the weights of the configuration parameter of the noise elimination algorithm need to be modified multiple times, the terminal device only acquires the voice control signals from the vehicle to be debugged once, which solves the problem that every time the configuration parameter of the noise elimination algorithm is modified, testers need to be called to input original voice signals to the vehicle to be debugged, thereby improving the test efficiency.

Figure 3:
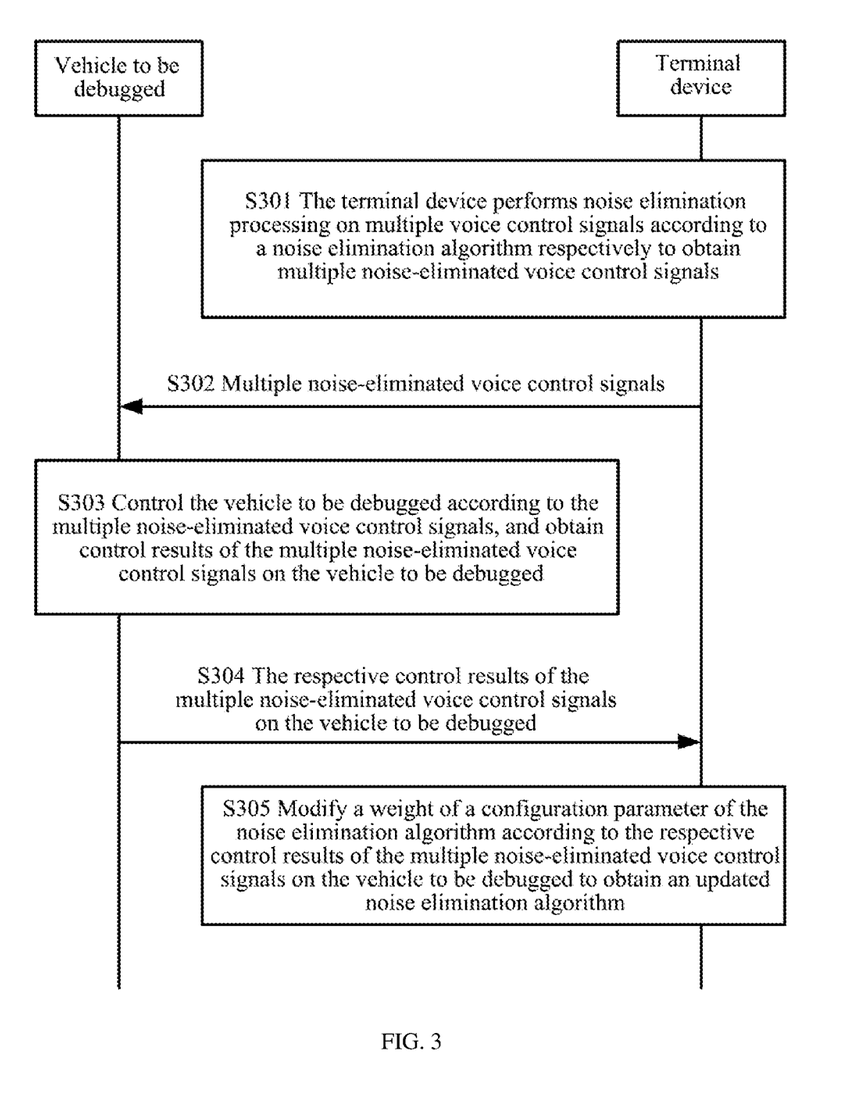
FIG. 3 is a schematic flowchart of a method for debugging a noise elimination algorithm according to a second embodiment of the present application.

Based on the embodiment shown in FIG. 2 above, in order to facilitate the understanding of how to modify the weight of the configuration parameter of the noise elimination algorithm in the digital signal processing based on the multiple voice control signals to obtain the updated noise elimination algorithm in the embodiment of the present application, the method of how to modify the weight of the configuration parameter of the noise elimination algorithm in the digital signal processing based on the multiple voice control signals to obtain the updated noise elimination algorithm is described in detail hereinafter through the second embodiment shown in FIG. 3 below.

Second Embodiment

FIG. 3 is a schematic flowchart of a method for debugging a noise elimination algorithm according to a second embodiment of the present application. The method for debugging the noise elimination algorithm can also be executed by software and/or hardware devices. For an example, please refer to FIG. 3, the method for debugging the noise elimination algorithm may include:

S301. A terminal device performs noise elimination processing on multiple voice control signals according to a noise elimination algorithm respectively to obtain multiple noise-eliminated voice control signals.

S302. The terminal device sends the multiple noise-eliminated voice control signals to a vehicle to be debugged.

For example, when the terminal device sends the multiple noise-eliminated voice control signals to the vehicle to be debugged, it can send the multiple noise-eliminated voice control signals to the vehicle to be debugged through a wireless network, or send the multiple noise-eliminated voice control signals to the vehicle to be debugged through Bluetooth connection, or in other ways, such as U disk copy, which can be specifically set according to actual needs. Here, the embodiment of the present application is only described by taking an example where the vehicle to be debugged can send the multiple noise-eliminated voice control signals to the vehicle to be debugged through a wireless network or through a Bluetooth connection, but it does not mean that the embodiment of the present application is limited to this.

S303. The vehicle to be debugged controls the vehicle to be debugged according to the multiple noise-eliminated voice control signals, and obtains control results of the multiple noise-eliminated voice control signals on the vehicle to be debugged.

The control results include that the control is successful or the control is failed.

After the vehicle to be debugged receives the multiple noise-eliminated voice control signals sent by the terminal device, it can control the vehicle to be debugged according to the multiple noise-eliminated voice control signals, and count a control result of each noise-eliminated voice control signal on the vehicle to be debugged, and then send respective control results of the multiple noise-eliminated voice control signals on the vehicle to be debugged obtained by statistics to the terminal device.

S304. The vehicle to be debugged sends the respective control results of the multiple noise-eliminated voice control signals on the vehicle to be debugged to the terminal device.

For example, when the vehicle to be debugged sends the respective control results of the multiple noise-eliminated voice control signals on the vehicle to be debugged to the terminal device, it can send the respective control results of the multiple noise-eliminated voice control signals on the vehicle to be debugged to the terminal device through a wireless network, or it can send the respective control results of the multiple noise-eliminated voice control signals on the vehicle to be debugged to the terminal device through a Bluetooth connection, or in other ways, such as U disk copy, which can be specifically set according to actual needs. Here, the embodiment of the present application is only described by taking an example where the vehicle to be debugged can send the respective control results of the multiple noise-eliminated voice control signals on the vehicle to be debugged to the terminal device through a wireless network or through a Bluetooth connection, but it does not mean that the embodiment of the present application is limited to this.

S305. The terminal device modifies a weight of a configuration parameter of the noise elimination algorithm according to the respective control results of the multiple noise-eliminated voice control signals on the vehicle to be debugged to obtain an updated noise elimination algorithm.

Exemplarily, when the terminal device modifies the weight of the configuration parameter of the noise elimination algorithm according to the respective control results of the multiple noise-eliminated voice control signals on the vehicle to be debugged, it can first determine a voice control signal whose control is failed among the multiple noise-eliminated voice control signals according to the respective control results of the multiple noise-eliminated voice control signals on the vehicle to be debugged, and modify the weight of the configuration parameter of the noise elimination algorithm according to the voice control signal whose control is failed. For example, the voice control signal whose control is failed includes wind noise, a weight of a configuration parameter corresponding to the wind noise of the noise elimination algorithm is modified; the voice control signal whose control is failed includes tire noise, a weight of a configuration parameter corresponding to the tire noise of the noise elimination algorithm is modified; or, the voice control signal whose control is failed includes whistles of other cars, a weight of a configuration parameter corresponding to the whistles of the noise elimination algorithm is modified, so as to obtain the updated noise elimination algorithm.

It is understandable that after the weights of some configuration parameters of the noise elimination algorithm are modified according to the voice control signal whose control is failed, the entire noise elimination algorithm may be affected, causing problems with the weights of other configuration parameters. Therefore, after the weight of the configuration parameter of the noise elimination algorithm is modified according to the voice control signal whose control is failed to obtain the updated noise elimination algorithm, instead of directly determining the updated noise elimination algorithm as the noise elimination algorithm that is finally put into use, it is necessary to adopt the updated noise elimination algorithm to perform eliminate noise processing on the multiple voice control signals again. If control results of the noise-eliminated noise control signals on the vehicle to be debugged do not meet the preset condition, it continues to modify the weight of the configuration parameter until the control results of the noise-eliminated voice control signals on the vehicle to be debugged meet the preset condition.

In the embodiment of the present application, every time the weight of the configuration parameter of the noise elimination algorithm is a noise elimination algorithm before modification, a modified noise elimination algorithm, and the respective control results of the multiple noise-eliminated voice control signals on the vehicle to be debugged. By outputting the debugging report, the debugging personnel can view each modification in real time, and can provide a reference base for subsequent modifications, which is helpful for the debugging personnel to subsequently modify the weight of the configuration parameter of the noise elimination algorithm.

It can be seen that when the weight of the configuration parameter of the noise elimination algorithm in the digital signal processing is modified based on the multiple voice control signals, the terminal device performs noise elimination processing on the multiple voice control signals according to the noise elimination algorithm respectively to obtain multiple noise-eliminated voice control signals, and sends the multiple noise-eliminated voice control signals to the vehicle to be debugged; the vehicle to be debugged controls the vehicle to be debugged according to the multiple noise-eliminated voice control signals to obtain respective control results of the multiple noise-eliminated voice control signals on the vehicle to be debugged, and sends the respective control results of the multiple noise-eliminated voice control signals on the vehicle to be debugged to the terminal device; the terminal device modifies the weight of the configuration parameter of the noise elimination algorithm according the respective control results of the multiple noise-eliminated voice control signals on the vehicle to be debugged to obtain the updated noise elimination algorithm, which realizes the debugging of the noise elimination algorithm. In addition, in the entire debugging process of the noise elimination algorithm, even if the weights of the configuration parameter of the noise elimination algorithm need to be modified multiple times, the terminal device only acquires the voice control signals from the vehicle to be debugged once, which solves the problem that every time the configuration parameter of the noise elimination algorithm is modified, testers need to be called to input original voice signals to the vehicle to be debugged, thereby improving the test efficiency.

Third Embodiment

Figure 4:
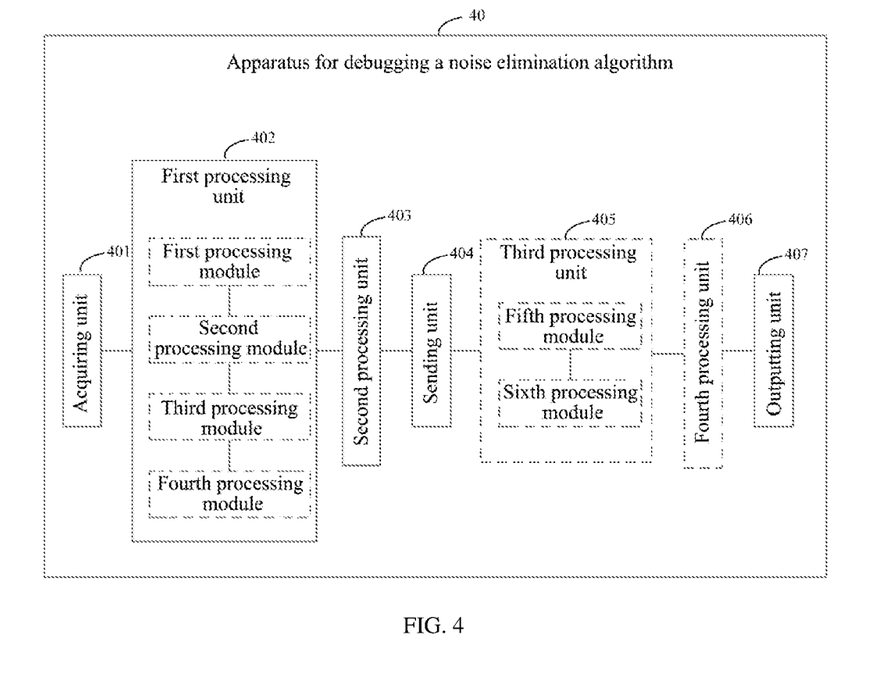
FIG. 4 is a schematic structural diagram of an apparatus for debugging a noise elimination algorithm according to a third embodiment of the present application.

FIG. 4 is a schematic structural diagram of an apparatus 40 for debugging a noise elimination algorithm according to a third embodiment of the present application. Exemplarily, please refer to FIG. 4, the apparatus 40 for debugging the noise elimination algorithm may include:

an acquiring unit 401, configured to acquire multiple voice control signals from a vehicle to be debugged;

a first processing unit 402, configured to modify a weight of a configuration parameter of the noise elimination algorithm in a digital signal processing based on the multiple voice control signals to obtain an updated noise elimination algorithm;

a second processing unit 403, configured to adopt the updated noise elimination algorithm to perform noise elimination processing on the multiple voice control signals; if control results of noise-eliminated voice control signals on the vehicle to be debugged do not meet a preset condition, continue to modify the weight of the configuration parameter until the control results of noise-eliminated voice control signals on the vehicle to be debugged meet the preset condition; and a sending unit 404, configured to send a noise elimination algorithm that meets the preset condition to the vehicle to be debugged.

Optionally, the first processing unit 402 includes a first processing module, a second processing module, a third processing module, and a fourth processing module.

The first processing module is configured to perform noise elimination processing on the multiple voice control signals respectively according to the noise elimination algorithm to obtain multiple noise-eliminated voice control signals.

The second processing module is configured to send the multiple noise-eliminated voice control signals to the vehicle to be debugged.

The third processing module is configured to acquire respective control results of the multiple noise-eliminated voice control signals on the vehicle to be debugged from the vehicle to be debugged.

The fourth processing module is configured to modify the weight of the configuration parameter of the noise elimination algorithm according to the respective control results of the multiple noise-eliminated voice control signals on the vehicle to be debugged to obtain the updated noise elimination algorithm.

Optionally, the fourth processing module includes a first processing sub-module and a second processing sub-module.

The first processing sub-module is configured to determine a voice control signal whose control is failed among the multiple noise-eliminated voice control signals according to the respective control results of the multiple noise-eliminated voice control signals on the vehicle to be debugged.

The second processing sub-module is configured to modify the weight of the configuration parameter of the noise elimination algorithm according to the voice control signal whose control is failed to obtain the updated noise elimination algorithm.

Optionally, the apparatus 40 for debugging the noise elimination algorithm further includes a third processing unit 405 and a fourth processing unit 406.

The third processing unit is configured to determine a control success rate corresponding to the multiple voice control signals according to the respective control results of the multiple noise-eliminated voice control signals on the vehicle to be debugged.

The fourth processing unit 406 is configured to determine that the control results on the vehicle to be debugged do not meet the preset condition if the control success rate corresponding to the multiple voice control signals is less than a preset threshold; and determine that the control results on the vehicle to be debugged meet the preset condition if the control success rate corresponding to the multiple voice control signals is greater than or equal to the preset threshold.

Optionally, the third processing unit includes a fifth processing module and a sixth processing module.

The fifth processing module is configured to determine a number of a voice control signals whose control is successful among the multiple noise-eliminated voice control signals according to the respective control results of the multiple noise-eliminated voice control signals on the vehicle to be debugged.

The sixth processing module is configured to determine a ratio of the number of the voice control signals whose control is successful with a number of the multiple noise-eliminated voice control signals as the control success rate corresponding to the multiple voice control signals.

Optionally, the apparatus 40 for debugging the noise elimination algorithm further includes an outputting unit 407.

The outputting unit 407 is configured to output a debugging report, wherein the debugging report comprises a noise elimination algorithm before modification, a modified noise elimination algorithm, and the respective control results of the multiple noise-eliminated voice control signals on the vehicle to be debugged.

The apparatus for debugging the noise elimination algorithm according to the embodiment of the present application can execute the technical solution of the method for debugging the noise elimination algorithm on the terminal device side in any of the above embodiments, and its implementation principle and beneficial effects are similar to the implementation principle and beneficial effects of the method for debugging the noise elimination algorithm on the terminal device side. Reference may be made to the implementation principle and beneficial effects of the method for debugging the noise elimination algorithm on the terminal device side, which will not be repeated here.

Fourth Embodiment

Figure 5:
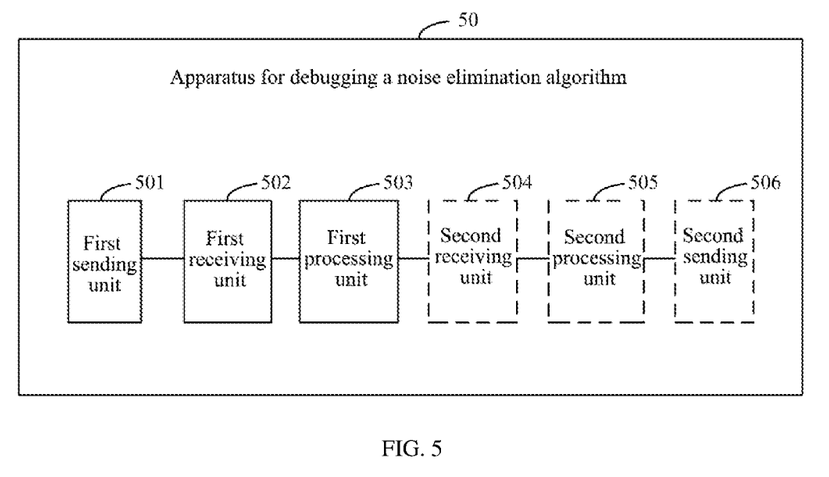
FIG. 5 is a schematic structural diagram of an apparatus for debugging a noise elimination algorithm according to a fourth embodiment of the present application.

FIG. 5 is a schematic structural diagram of an apparatus for debugging a noise elimination algorithm according to a fourth embodiment of the present application. For an example, please refer to FIG. 5, the apparatus for debugging the noise elimination algorithm may include:

a first sending unit 501, configured to send multiple voice control signals to a terminal device;

a first receiving unit 502, configured to receive a noise elimination algorithm that meets a preset condition from the terminal device; and a first processing unit 503, configured to perform noise elimination processing according to the noise elimination algorithm that meets the preset condition.

Optionally, the apparatus for debugging the noise elimination algorithm further includes a second receiving unit 504, a second processing unit 505, and a second sending unit 506.

The second receiving unit 504 is configured to receive multiple noise-eliminated voice control signals from the terminal device, wherein the multiple noise-eliminated voice control signals are obtained by performing noise elimination processing on the multiple voice control signals.

The second processing unit 505 is configured to control the vehicle to be debugged according to the multiple noise-eliminated voice control signals, and obtain respective control results of the multiple noise-eliminated voice control signals on the vehicle to be debugged.

The second sending unit 506 is configured to send the respective control results of the multiple noise-eliminated voice control signals on the vehicle to be debugged to the terminal device.

The apparatus for debugging the noise elimination algorithm according to the embodiment of the application can execute the technical solution of the method for debugging the noise elimination algorithm on the vehicle side to be debugged in any of the above embodiments, and its implementation principle and beneficial effects are similar to the implementation principle and beneficial effects of the method for debugging the noise elimination algorithm on the vehicle side to be debugged. Reference may be made to the implementation principle and beneficial effects of the method for debugging the noise elimination algorithm on the vehicle side to be debugged, which will not be repeated here.

The embodiments of the present application further provide a computer program product, including a computer program stored in a readable storage medium, at least one processor of an electronic device can read the computer program from the readable storage medium. The at least one processor executes the technical solution of the method for debugging the noise elimination algorithm described in any of the above embodiments, and its implementation principle and beneficial effects are similar to the implementation principle and beneficial effects of the method for debugging the noise elimination algorithm of the vehicle side to be debugged. Reference may be made to the implementation principle and beneficial effects of the method for debugging the noise elimination algorithm on the vehicle side to be debugged, which will not be repeated here.

According to the embodiments of the present application, the present application further provides an electronic device and a readable storage medium.

Figure 6:
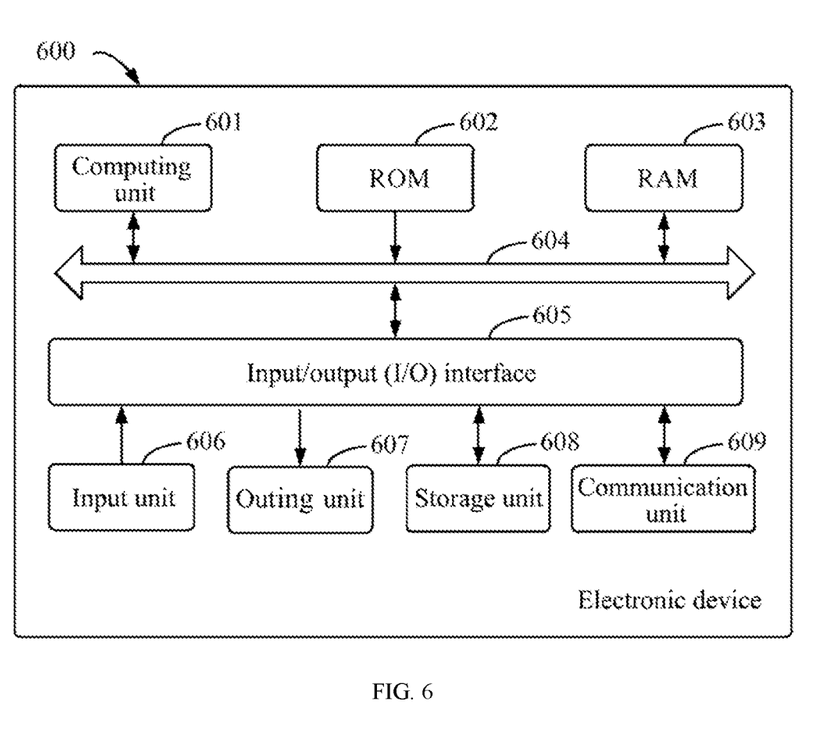
FIG. 6 is a schematic block diagram of an electronic device according to an embodiment of the present application.

FIG. 6 is a schematic block diagram of an electronic device 600 according to an embodiment of the present application. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile devices, such as a personal digital processing, a cellular phone, a smart phone, a wearable device, and other similar computing devices. The components shown herein, their connections and relationships, and their functions are merely examples, and are not intended to limit implementations of the present application described and/or claimed herein.

As shown in FIG. 6, the electronic device 600 includes a computing unit 601, which can perform various appropriate actions and processing based on a computer program stored in a read only memory (ROM) 602 or loaded from a storage unit 608 to a random access memory (RAM) 603 to. In the RAM 603, various programs and data required for the operation of the device 600 can also be stored. The calculation unit 601, the ROM 602, and the RAM 603 are connected to each other through a bus 604. An input/output (I/O) interface 605 is also connected to the bus 604.

A number of components in the device 600 are connected to the I/O interface 605, including: an input unit 606, such as a keyboard, a mouse, etc.; an outing unit 607, such as various types of displays, speakers, etc.; and a storage unit 608, such as a disk, optical disc, etc.; and a communication unit 609, such as network card, modem, wireless communication transceiver, etc. The communication unit 609 allows the device 600 to exchange information/data with other devices through a computer network such as the internet and/or various telecommunication networks.

The computing unit 601 may be various general-purpose and/or special-purpose processing components with processing and computing capabilities. Some examples of the computing unit 601 include, but are not limited to, central processing unit (CPU), graphics processing unit (GPU), various dedicated artificial intelligence (AI) computing chips, various computing units that run machine learning model algorithms, and digital signal processing (DSP), and any appropriate processor, controller, microcontroller, etc. The calculation unit 601 executes the various methods and processes described above, for example, the method for debugging the noise elimination algorithm. For example, in some embodiments, the method for debugging the noise elimination algorithm may be implemented as a computer software program, which is tangibly contained in a machine-readable medium, such as the storage unit 608. In some embodiments, part or all of the computer program may be loaded and/or installed on the device 600 via the ROM 602 and/or the communication unit 609. When the computer program is loaded into the RAM 603 and executed by the calculation unit 601, one or more steps of the method for debugging the noise elimination algorithm described above can be executed. Alternatively, in other embodiments, the calculation unit 601 may be configured to execute the method for debugging the noise elimination algorithm in any other suitable manners (for example, by means of firmware).

The various implementations of the systems and technologies described in this article above can be implemented in a digital electronic circuit system, an integrated circuit system, a field programmable gate array (FPGA), an application specific integrated circuit (ASIC), an application-specific standard product (ASSP), a system on chip system (SOC), a load programmable logic device (CPLD), a computer hardware, a firmware, a software, and/or a combination thereof. These various implementations may include: implementations implemented in one or more computer programs, where the one or more computer programs may be executed and/or interpreted on a programmable system including at least one programmable processor, and the programmable processor may be a dedicated or generic programmable processor, which may receive data and instructions from a storage system, at least one input apparatus and at least one output apparatus, and transmit the data and the instructions to the storage system, the at least one input apparatus and the at least one output apparatus.

The program code used to implement the method of the present application can be written in any combination of one or more programming languages. These program codes can be provided to the processors or controllers of general-purpose computers, special-purpose computers, or other programmable data processing devices, so that the program codes, when executed by the processors or controllers, enable the functions/operations specified in the flowcharts and/or block diagrams is implemented. The program code can be executed entirely on the machine, partly executed on the machine, partly executed on the machine and partly executed on the remote machine as an independent software package, or entirely executed on the remote machine or server.

In the context of the present application, the machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

For provision of interaction with a user, the system and the technique described herein may be implemented on a computer, and the computer has: a display device for displaying information to the user (such as a CRT (cathode ray tube) or an LCD (liquid crystal display) monitor); and a keyboard and a pointing device (such as a mouse or a trackball), the user may provide an input to the computer through the keyboard and the pointing device. Other kinds of devices may also be used to provide the interaction with the user; for example, feedback provided to the user may be any form of sensor feedback (e.g., visual feedback, auditory feedback, or tactile feedback); and may receive the input from the user in any form (including an acoustic input, a voice input, or a tactile input).

The system and the technique described herein may be implemented in a computing system that includes back-end components (for example, as a data server), or a computing system that includes intermediate components (for example, an application server), or a computing system that includes front-end components (for example, a user computer with a graphical user interface or a web browser through which the user may interact with the implementations of the systems and the techniques described herein), or a computing system that includes any combination of the back-end components, the intermediate components, or the front-end components. The components of the system may be interconnected by any form or medium of digital data communications (e.g., a communication network). Examples of the communication network include: a local area network (LAN), a wide area network (WAN), and Internet.

The computer system may include a client and a server. The client and the server are generally far away from each other, and generally interact with each other through the communication network. A relationship between the client and the server is generated by computer programs running on a corresponding computer and having a client-server relationship. The server can be a cloud server, also known as a cloud computing server or a cloud host. It is a host product in a cloud computing service system to solve shortcomings of traditional physical hosting and VPS services ("Virtual Private Server", or "VPS" for short), which are difficulty in management and weakness in business scalability. The server can also be a server of a distributed system, or a server combined with a block chain.

It should be understood that the various forms of processes shown above can be used, and reordering, addition, or deletion of a step can be performed. For example, the steps recorded in the present application can be executed concurrently, sequentially, or in different orders, provided that desirable results of the technical solutions disclosed in the present application could be achieved, and there is no limitation herein.

The above specific embodiments do not constitute a limitation on the protection scope of the present application. Those skilled in the art should understand that various modifications, combinations, sub-combinations, and replacements can be made according to design requirements and other factors. Any modification, equivalent replacement and improvement made within the spirit and principle of the present application shall be included in the protection scope of the present application.

What is claimed is:

1. A method for debugging a noise elimination algorithm, wherein the method is performed by a terminal device and comprises:

acquiring multiple voice control signals from a vehicle to be debugged, wherein the multiple voice control signals comprise a voice signal for controlling a window of the vehicle to be debugged;

modifying a weight of a configuration parameter of the noise elimination algorithm in a digital signal processing based on the multiple voice control signals to obtain an updated noise elimination algorithm;

adopting the updated noise elimination algorithm to perform noise elimination processing on the multiple voice control signals;

sending the multiple noise-eliminated voice control signals to the vehicle to be debugged;

acquiring control results of the multiple noise-eliminated voice control signals on the vehicle to be debugged, wherein the control results comprises whether the window of the vehicle to be debugged is closed;

determining whether the control results of the multiple noise-eliminated voice control signals on the vehicle to be debugged meet a preset condition;

in response to determining that the control results of the multiple noise-eliminated voice control signals on the vehicle to be debugged does not meet the preset condition, continuing to modify the weight of the configuration parameter until the control results of the noise-eliminated voice control signals on the vehicle to be debugged are determined to meet the preset condition;

in response to determining that the control results of the multiple noise-eliminated voice control signals on the vehicle to be debugged meet the preset condition, sending the updated noise elimination algorithm to the vehicle to be debugged.

2. The method according to claim 1, wherein the modifying the weight of the configuration parameter of the noise elimination algorithm in the digital signal processing based on the multiple voice control signals to obtain the updated noise elimination algorithm comprises:

performing noise elimination processing on the multiple voice control signals respectively according to the noise elimination algorithm to obtain multiple noise-eliminated voice control signals;

sending the multiple noise-eliminated voice control signals to the vehicle to be debugged;

acquiring respective control results of the multiple noise-eliminated voice control signals on the vehicle to be debugged from the vehicle to be debugged; and modifying the weight of the configuration parameter of the noise elimination algorithm according to the respective control results of the multiple noise-eliminated voice control signals on the vehicle to be debugged to obtain the updated noise elimination algorithm.

3. The method according to claim 2, wherein the modifying the weight of the configuration parameter of the noise elimination algorithm according to the respective control results of the multiple noise-eliminated voice control signals on the vehicle to be debugged to obtain the updated noise elimination algorithm comprises:
determining a voice control signal whose control is failed among the multiple noise-eliminated voice control signals according to the respective control results of the multiple noise-eliminated voice control signals on the vehicle to be debugged; and
modifying the weight of the configuration parameter of the noise elimination algorithm according to the voice control signal whose control is failed to obtain the updated noise elimination algorithm.

4. The method according to claim 2, further comprising:
determining a control success rate corresponding to the multiple voice control signals according to the respective control results of the multiple noise-eliminated voice control signals on the vehicle to be debugged;
determining that the control results on the vehicle to be debugged do not meet the preset condition if the control success rate corresponding to the multiple voice control signals is less than a preset threshold; and
determining that the control results on the vehicle to be debugged meet the preset condition if the control success rate corresponding to the multiple voice control signals is greater than or equal to the preset threshold.

5. The method according to claim 4, wherein the determining the control success rate corresponding to the multiple voice control signals according to the respective control results of the multiple noise-eliminated voice control signals on the vehicle to be debugged comprises:
determining a number of a voice control signals whose control is successful among the multiple noise-eliminated voice control signals according to the respective control results of the multiple noise-eliminated voice control signals on the vehicle to be debugged; and
determining a ratio of the number of the voice control signals whose control is successful with a number of the multiple noise-eliminated voice control signals as the control success rate corresponding to the multiple voice control signals.

6. The method according to claim 1, further comprising:
determining a control success rate corresponding to the multiple voice control signals according to the respective control results of the multiple noise-eliminated voice control signals on the vehicle to be debugged;
determining that the control results on the vehicle to be debugged do not meet the preset condition if the control success rate corresponding to the multiple voice control signals is less than a preset threshold; and
determining that the control results on the vehicle to be debugged meet the preset condition if the control success rate corresponding to the multiple voice control signals is greater than or equal to the preset threshold.

7. The method according to claim 6, wherein the determining the control success rate corresponding to the multiple voice control signals according to the respective control results of the multiple noise-eliminated voice control signals on the vehicle to be debugged comprises:
determining a number of a voice control signals whose control is successful among the multiple noise-eliminated voice control signals according to the respective control results of the multiple noise-eliminated voice control signals on the vehicle to be debugged; and
determining a ratio of the number of the voice control signals whose control is successful with a number of the multiple noise-eliminated voice control signals as the control success rate corresponding to the multiple voice control signals.

8. The method according to claim 1, further comprising:
outputting a debugging report, wherein the debugging report comprises a noise elimination algorithm before modification, a modified noise elimination algorithm, and the respective control results of the multiple noise-eliminated voice control signals on the vehicle to be debugged.

9. An apparatus for debugging a noise elimination algorithm, comprising:
at least one processor; and
a memory communicatively connected with the at least one processor; wherein,
the memory stores instructions executable by the at least one processor, and the at least one processor, when executing the instructions, is configured to:
acquire multiple voice control signals from a vehicle to be debugged, wherein the multiple voice control signals comprise a voice signal for controlling a window of the vehicle to be debugged;
modify a weight of a configuration parameter of the noise elimination algorithm in a digital signal processing based on the multiple voice control signals to obtain an updated noise elimination algorithm;
adopt the updated noise elimination algorithm to perform noise elimination processing on the multiple voice control signals;
send the multiple noise-eliminated voice control signals to the vehicle to be debugged;
acquire control results of the multiple noise-eliminated voice control signals on the vehicle to be debugged, wherein the control results comprises whether the window of the vehicle to be debugged is closed;
determine whether the control results of the multiple noise-eliminated voice control signals on the vehicle to be debugged meet a preset condition;
in response to determining that the control results of the multiple noise-eliminated voice control signals on the vehicle to be debugged does not meet the preset condition, continue to modify the weight of the configuration parameter until the control results of the noise-eliminated voice control signals on the vehicle to be debugged are determined to meet the preset condition;
in response to determining that the control results of the multiple noise-eliminated voice control signals on the vehicle to be debugged meet the preset condition, control a transceiver to send the updated noise elimination algorithm to the vehicle to be debugged.

10. The apparatus according to claim 9, wherein the at least one processor is configured to:
perform noise elimination processing on the multiple voice control signals respectively according to the noise elimination algorithm to obtain multiple noise-eliminated voice control signals;
control the transceiver to send the multiple noise-eliminated voice control signals to the vehicle to be debugged;
acquire respective control results of the multiple noise-eliminated voice control signals on the vehicle to be debugged from the vehicle to be debugged; and
modify the weight of the configuration parameter of the noise elimination algorithm according to the respective control results of the multiple noise-eliminated voice control signals on the vehicle to be debugged to obtain the updated noise elimination algorithm.

11. The apparatus according to claim 10, wherein the at least one processor is configured to:
- determine a voice control signal whose control is failed among the multiple noise-eliminated voice control signals according to the respective control results of the multiple noise-eliminated voice control signals on the vehicle to be debugged; and
- modify the weight of the configuration parameter of the noise elimination algorithm according to the voice control signal whose control is failed to obtain the updated noise elimination algorithm.

12. The apparatus according to claim 10, wherein the at least one processor is configured to:
- determine a control success rate corresponding to the multiple voice control signals according to the respective control results of the multiple noise-eliminated voice control signals on the vehicle to be debugged; and
- determine that the control results on the vehicle to be debugged do not meet the preset condition if the control success rate corresponding to the multiple voice control signals is less than a preset threshold; and determine that the control results on the vehicle to be debugged meet the preset condition if the control success rate corresponding to the multiple voice control signals is greater than or equal to the preset threshold.

13. The apparatus according to claim 12, wherein the at least one processor is configured to:
- determine a number of a voice control signals whose control is successful among the multiple noise-eliminated voice control signals according to the respective control results of the multiple noise-eliminated voice control signals on the vehicle to be debugged; and
- determine a ratio of the number of the voice control signals whose control is successful with a number of the multiple noise-eliminated voice control signals as the control success rate corresponding to the multiple voice control signals.

14. The apparatus according to claim 10, further comprising an outputting unit;
- wherein the at least one processor is configured to:
- output a debugging report, wherein the debugging report comprises a noise elimination algorithm before modification, a modified noise elimination algorithm, and the respective control results of the multiple noise-eliminated voice control signals on the vehicle to be debugged.

15. The apparatus according to claim 9, wherein the at least one processor is configured to:
- determine a control success rate corresponding to the multiple voice control signals according to the respective control results of the multiple noise-eliminated voice control signals on the vehicle to be debugged; and
- determine that the control results on the vehicle to be debugged do not meet the preset condition if the control success rate corresponding to the multiple voice control signals is less than a preset threshold; and determine that the control results on the vehicle to be debugged meet the preset condition if the control success rate corresponding to the multiple voice control signals is greater than or equal to the preset threshold.

16. The apparatus according to claim 15, wherein the at least one processor is configured to:
- determine a number of a voice control signals whose control is successful among the multiple noise-eliminated voice control signals according to the respective control results of the multiple noise-eliminated voice control signals on the vehicle to be debugged; and
- determine a ratio of the number of the voice control signals whose control is successful with a number of the multiple noise-eliminated voice control signals as the control success rate corresponding to the multiple voice control signals.

17. The apparatus according to claim 9, further comprising an outputting unit;
- wherein the at least one processor is configured to:
- output a debugging report, wherein the debugging report comprises a noise elimination algorithm before modification, a modified noise elimination algorithm, and the respective control results of the multiple noise-eliminated voice control signals on the vehicle to be debugged.

18. A non-transitory computer-readable storage medium storing computer instructions, wherein the computer instructions are used to cause a computer to execute the method for debugging the noise elimination algorithm according to claim 1.

* * * * *